United States Patent [19]
Lin

[11] Patent Number: 5,618,423
[45] Date of Patent: Apr. 8, 1997

[54] ON-THE-FLY LONG-RUNNING ROTARY FILTRATION SCREEN DEVICE

[76] Inventor: Ping Ho Lin, No. 2, Alley 54, Lane 747, Chung Cheng Pei Rd., Young Kang, Tainan, Taiwan

[21] Appl. No.: 685,297

[22] Filed: Jul. 23, 1996

[51] Int. Cl.$^6$ .......................... B01D 33/073; B01D 33/29; B01D 33/52; B01D 33/76
[52] U.S. Cl. ...................... 210/360.2; 210/370; 210/376; 210/380.3; 210/402; 425/197
[58] Field of Search ................................. 210/360.2, 370, 210/376, 380.3, 402; 425/197

[56] References Cited

U.S. PATENT DOCUMENTS

| | | |
|---|---|---|
| 2,442,234 | 5/1948 | Dunmire . |
| 2,670,849 | 3/1954 | Dunmire . |
| 3,750,885 | 8/1973 | Fournier . |
| 4,302,330 | 11/1981 | Cusato . |
| 4,511,472 | 4/1985 | Trott . |
| 4,597,870 | 7/1986 | Lambertus . |
| 4,752,386 | 6/1988 | Schulz . |
| 5,200,074 | 4/1993 | Suzuki . |
| 5,387,339 | 2/1995 | Lee . |
| 5,423,977 | 6/1995 | Aoki . |

*Primary Examiner*—Thomas M. Lithgow
*Attorney, Agent, or Firm*—Pro-Techtor International

[57] ABSTRACT

The present invention concerns an on-the-fly long-running rotary filtration screen device, wherein a split-flow bar and a filtration sleeve are screwed together to form a filtration bar, a filtration screen is inserted onto the cylinder on the filtration sleeve, the cylinder is equipped with round holes, the split-flow bar is equipped with two square slots facing opposite from each other, a large gear to be installed onto the split-flow bar also possesses identical square slots, so that the split-flow bar and the large gear are attached to each other by means of inserting two square keys into the two square slots and then inserting a stopping disc, the bottom of the main housing is equipped with a circular sunk slot connecting to an outlet housing, a residue-removing rod is inserted into a round hole at the lower part of the main housing and, after actuating a motor, the rotating large gear causes the filtration bar to rotate, the action of a hydraulic cylinder pressing against a round rod at the front part of the split-flow bar causes the filtration bar to reciprocate, thereby allowing a plastic raw material to be filtered and agitated by the filtration screen and the small holes on the filtration cylinder to obtain a homogeneous purified plastic raw material, the extraneous matters are collected by a residue-removing rod, and a hydraulic cylinder behind the residue-removing bar pushes the residue-removing bar outward, thereby eliminating the extraneous matters and achieving the excellent effects of obtaining a higher-purity raw material on the fly for a long period of time.

1 Claim, 6 Drawing Sheets

ON-THE-FLY LONG-RUNNING ROTARY FILTRATION SCREEN DEVICE

BACKGROUND OF THE INVENTION

The present invention concerns an on-the-fly long-running rotary filtration screen device. More specifically, the present invention relates to an on-the-fly long-running rotary filtration screen device, wherein a filtration rod that comprises a rotating split flow rod and a filtration sleeve is employed to filter away extraneous matters, so that a cleaner raw material can be obtained, without the need to change the filtration screen, so that an on-the-fly long-running filtration operation can be maintained.

Conventional filtration devices typically involve inserting a filtration screen onto a split flow bar. However, this design is problematic in that the operating machinery must be stopped periodically in order to remove the extraneous matters collected by the filtration screen, and because this cleaning procedure is time consuming, it interrupts the transport of raw material and it is uneconomical. As a result, productivity is adversely affected. Moreover, since extraneous matters cannot be removed continuously, a thorough filtration process cannot be realized and the filtered raw material still contains some extraneous matter.

The on-the-fly long-running rotary filtration screen device of the present invention is based on a circumferential filtration method with which the filtration surface can be increased and extraneous matters that are away from the filtering action can also be brought close to the filtration screen and removed by a rotating agitation action. Accordingly, the filtration effect of the device of the present invention is many times better than that of conventional filtration devices. The following merits can be achieved with the design improvement of the present invention:

1. On-the-fly operation: With the filtration device of the present invention, a hydraulic cylinder is employed to push a residue-removing rod outward to expose the filtration screen for cleaning away extraneous matters. Accordingly, the operating machinery can operate continuously without interruptions in the production cycle. Furthermore, the cleaning operation is simple, since it is not necessary to stop the operating machinery to remove the split flow bar, as is the case with conventional filtration devices.
2. Time savings: Since the filtration screen can be cleaned without interrupting the feeding process, the time required to filter a plastic material can be reduced and the feeding process is not subject to down time.
3. Thorough filtration: The dual layer filtration design of the present invention allows extraneous matters to be removed entirely. In addition, the moving hydraulic cylinder 46 causes the filtration bar to move reciprocally, which agitates the plastic raw material inside the rotating cylinder 3 to bring about uniformity. The round hole at the lower side allows extraneous matters to flow into the elliptical opening 35 and circular opening 36 of the residue-removing rod 12. The residue-removing rod 12 is pushed outward periodically or when a certain amount of extraneous matters has been accumulated by the hydraulic cylinder 46 to allow the extraneous matter to be discharged from the residue-removing rod 12. Accordingly, the extraneous matter collected can be easily disposed of. Another benefit is that the plastic material filtered is quite pure and thus can pass through the filter quite readily, which is desirable from the standpoint of economics, and that it has a higher degree of purity and uniformity in comparison with conventional products.
4. Longer working life: The filtration device of the present invention is completely automatic and does not required disassembly, which is desirable from the standpoint of labor and maintenance costs. Moreover, the problem of damaging parts and components due to disassembly, which can happen with conventional filtration devices, is alleviated.

DESCRIPTION OF THE PREFERRED EMBODIMENT(S)

Figure 1:
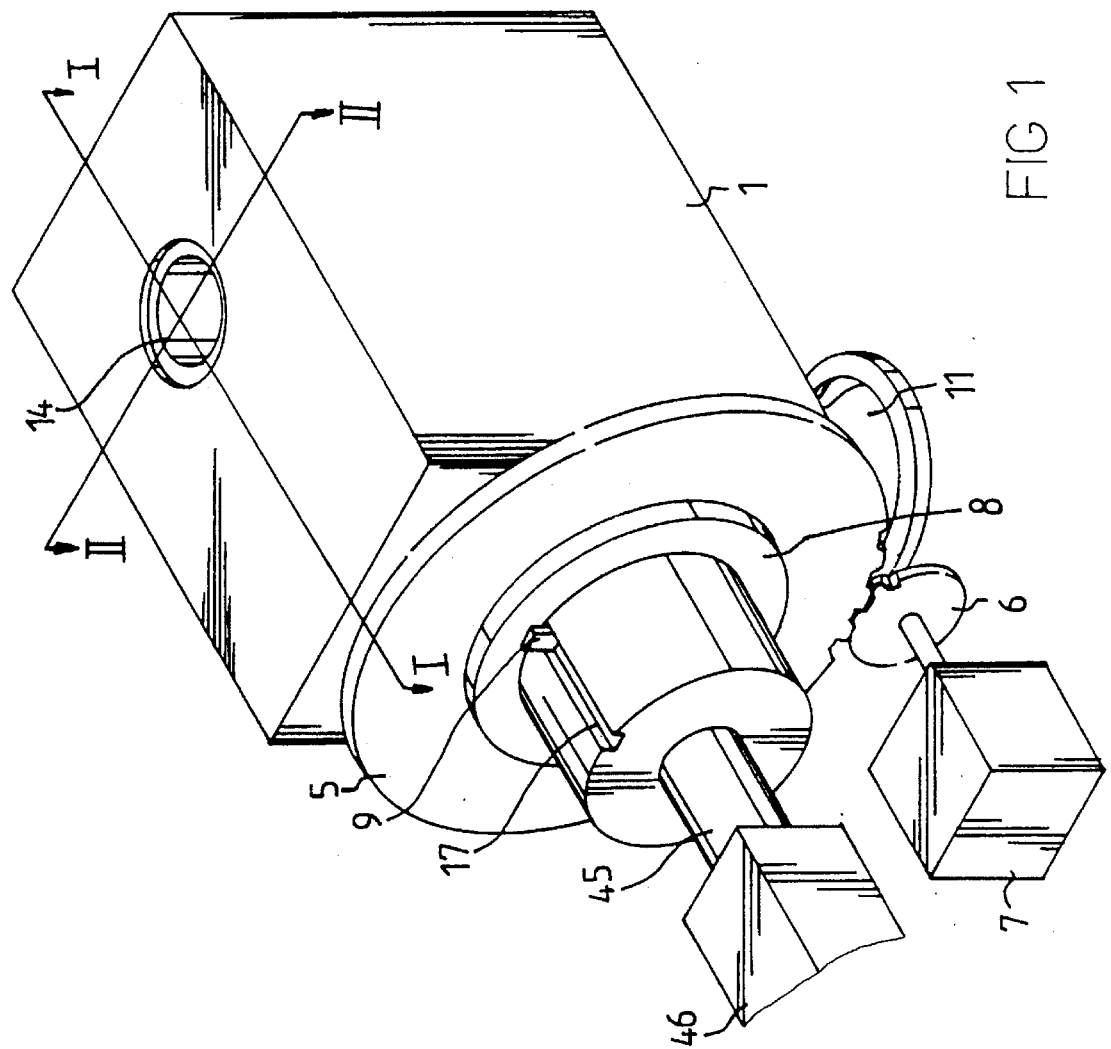
FIG. 1 is a three-dimensional drawing of the filtration device of the present invention.
Figure 2:
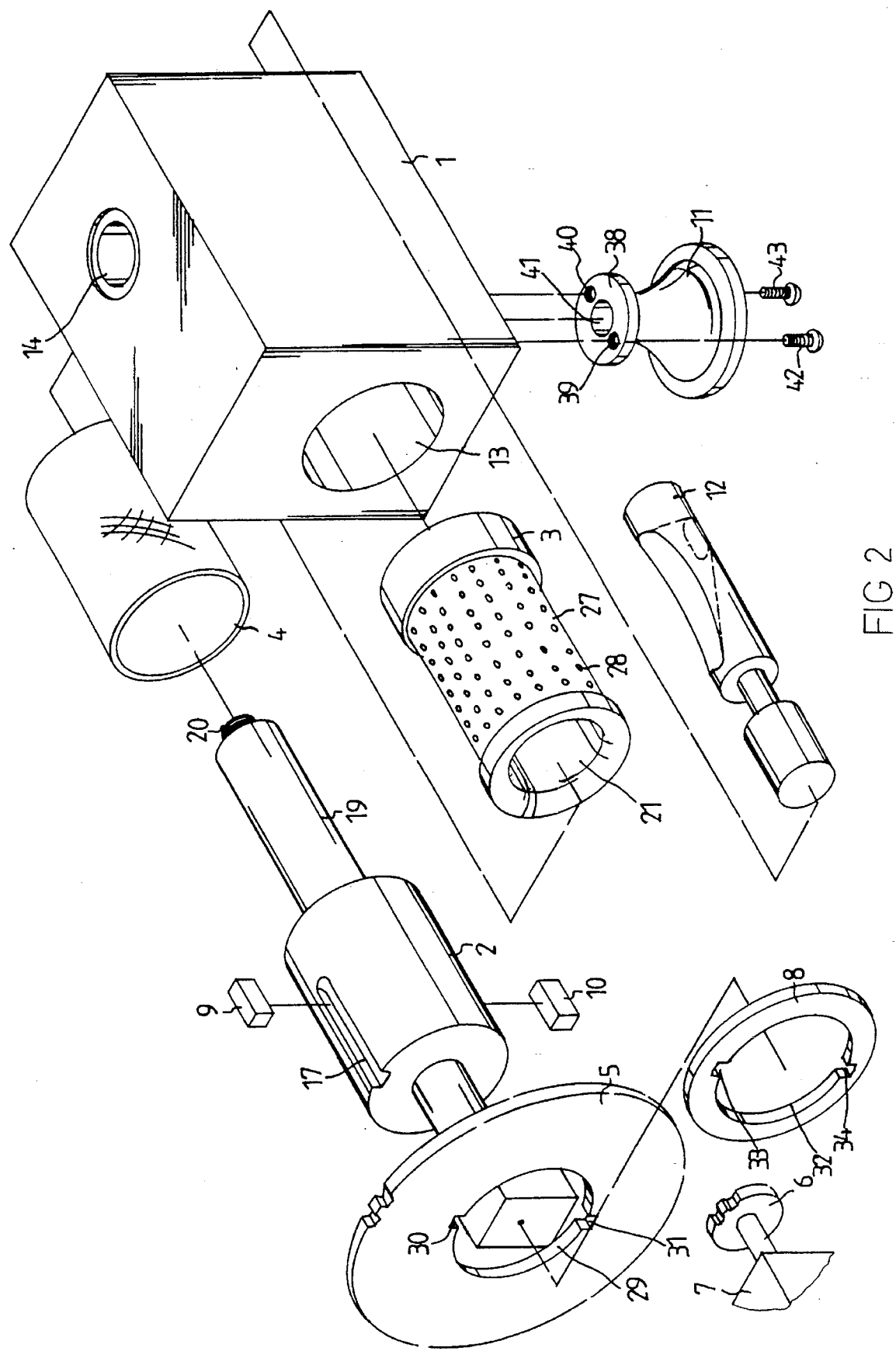
FIG. 2 is a dissectional drawing of the filtration device of the present invention.
Figure 3:
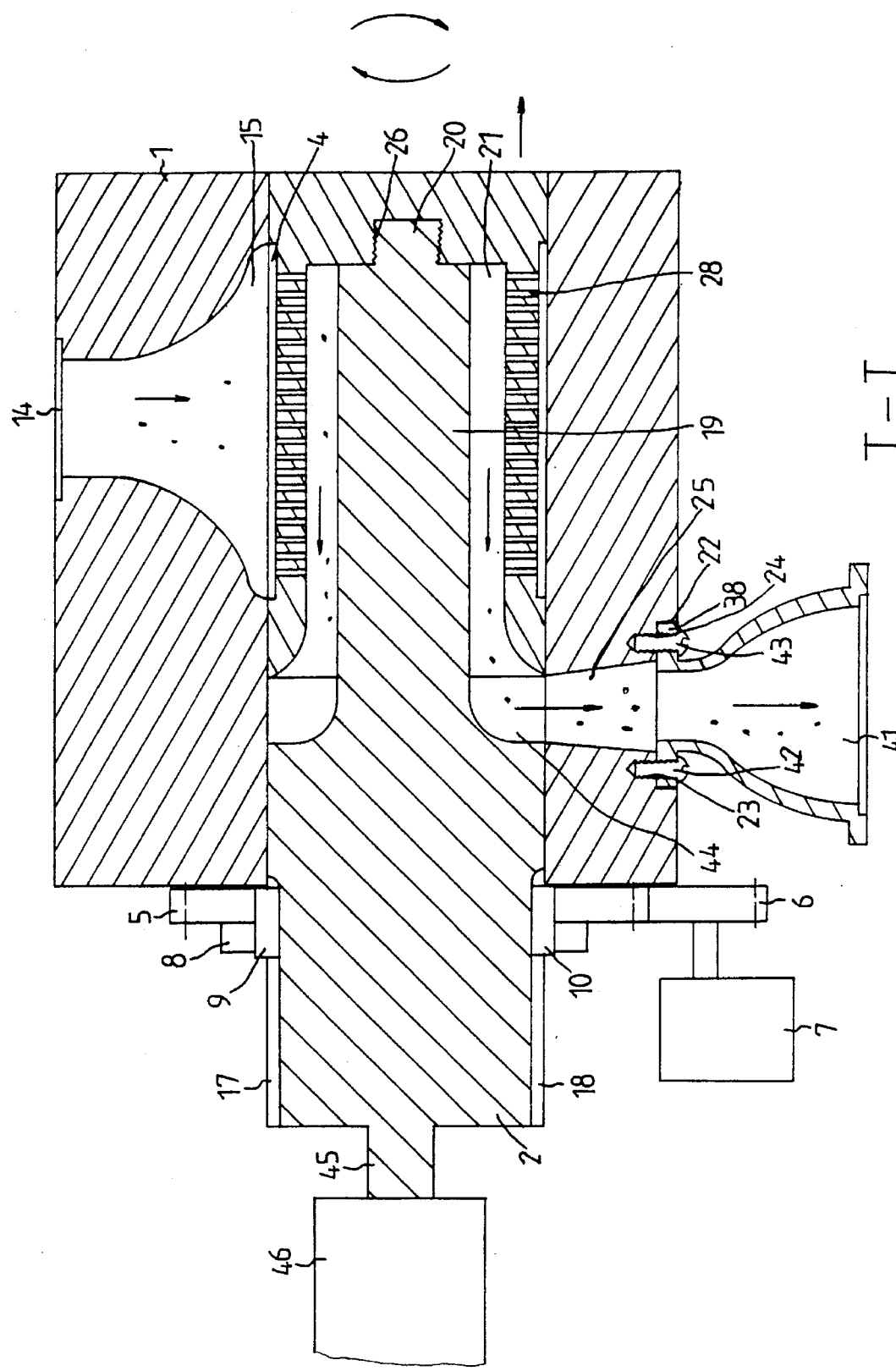
FIG. 3 is a cut-away drawing of the I—I section of the filtration device of the present invention.
Figure 4:
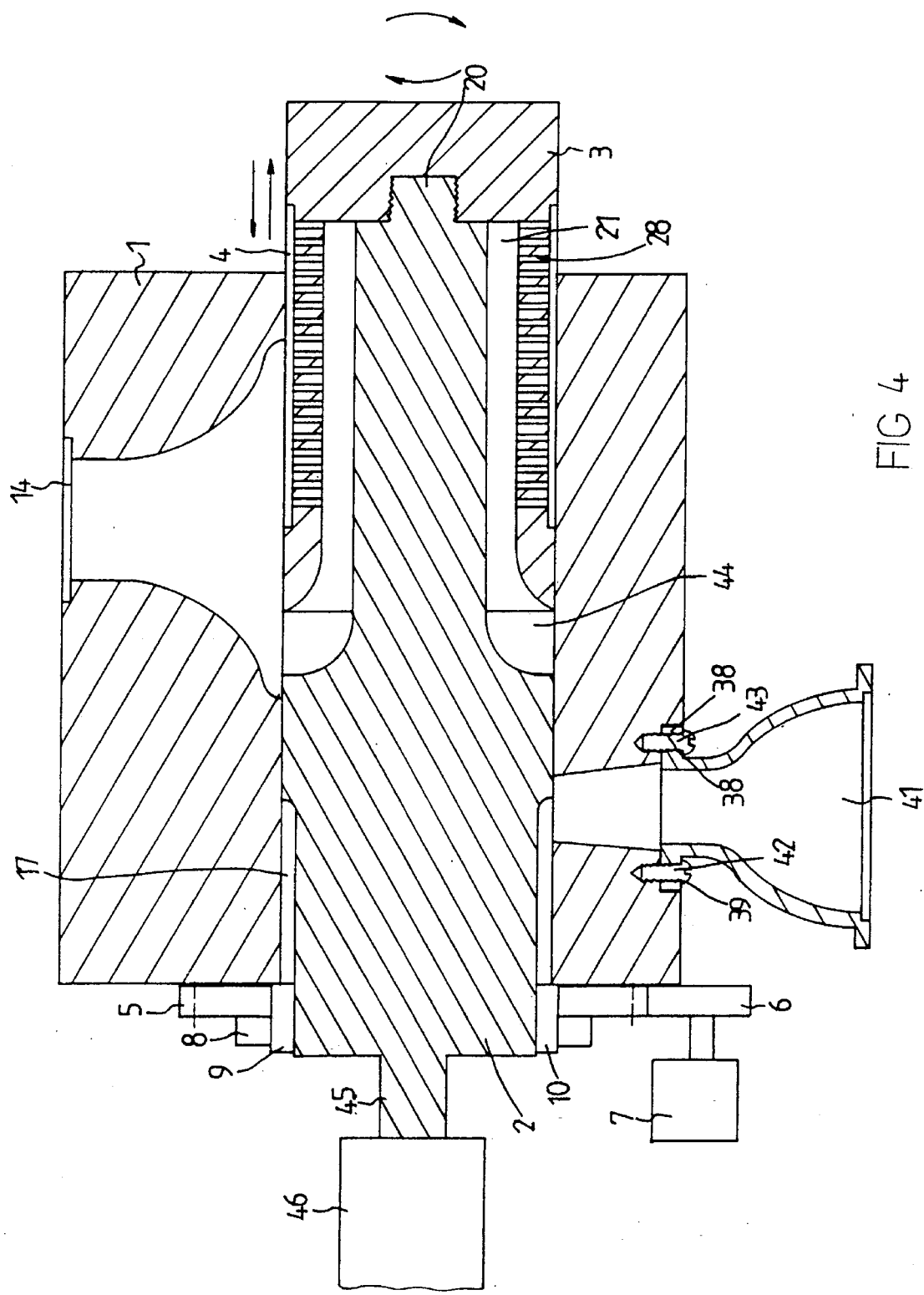
FIG. 4 shows the action of the I—I section of the filtration device of the present invention.
Figure 5:
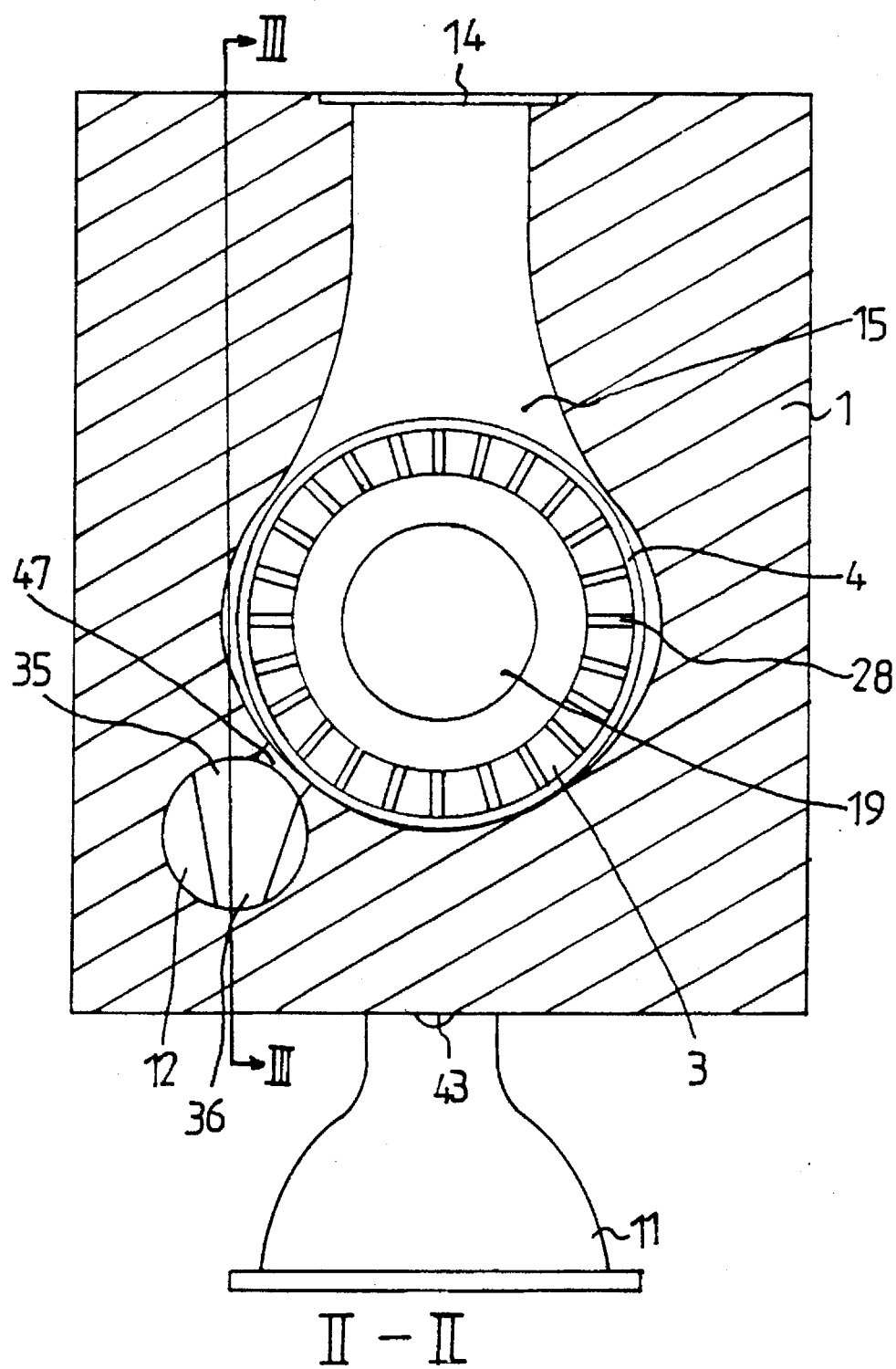
FIG. 5 is a cut-away drawing of the II—II section of the filtration device of the present invention.
Figure 6:
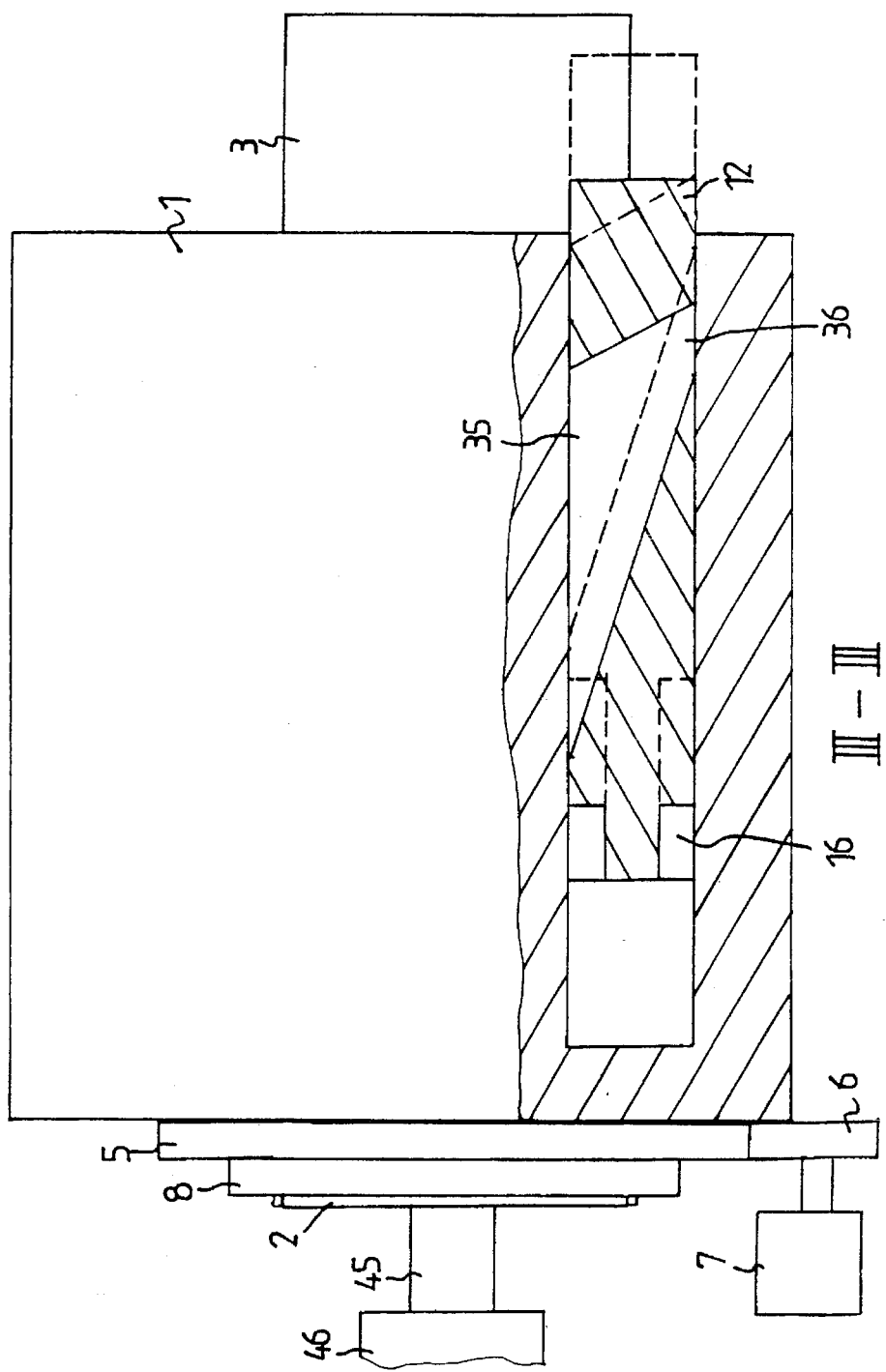
FIG. 6 is a cut-away drawing showing the action of the III—III section of the filtration device of the present invention.

As shown in FIGS. 1 and 2, the on-the-fly long-running rotary filtration screen device of the present invention comprises a main housing 1, a split-flow bar 2, a filtration sleeve 3, a filtration screen 4, a large gear 5, a small gear 6, a motor 7, a stop disc 8, two square keys 9 and 10, an outlet housing 11 and a residue-removing rod 12. The interior of the main housing 1 is equipped with a round through hole 13, the upper part is equipped with a perpendicular intake opening 14, the intake opening extends downward and is tapered to form a funnel-shape opening 15, the funnel-shape opening 15 is connected to the round through hole 13, the lower side of the round through hole 13 is also equipped with a round hole 16 (shown in FIGS. 5 and 6), a conduit 47 connecting the two round holes 13 and 16 is installed between the round hole 16 and round through hole 13, the round hole 16 does not completely piece through the main housing 1, the true bottom of the rear part of the main housing 1 is equipped with a circular sunk slot 22, the circular sunk slot 22 is equipped with two small perpendicular threaded holes 23 and 24, and the center of the circular sunk slot 22 is equipped with a conical hole 25 that connects with the round through hole 13. The upper and lower portions of the split-flow bar 2 are each equipped appropriately with a long rectangular slot 17 or 18, one end of the split-flow bar 2 is equipped with a round rod 45, the round rod 45 is connected to a hydraulic cylinder 45, the other end of the split-flow bar 2 is equipped with a round rod 19 with a smaller diameter, and the end of the round rod 19 is equipped with a threaded rod 20 with a diameter smaller than that of the round rod 19. The center of the filtration sleeve 3 is equipped with a non-piecing threaded round hole 26, the inner side of the filtration sleeve 3 is equipped with a cylinder 27, the cylinder 27 is equipped with a number of small round holes 28, and these small round holes 28 are opened to the round hole 21. For the large gear 5, the outer rim is toothed and the center is equipped with a round hole 29, and the round hole 29 is equipped with two square slots 30 and 31 facing each other from opposite sides. The center of the stopping disc 8 is equipped with a round hole 32, and the round hole 32 is equipped with two square slots 33 and 34. As for the residue-removing rod 12, it has the shape of a round rod, the upper part of which is equipped with a long elliptical opening 35, and the elliptical openings sloped downward to form a smaller round through hole 36 (as shown in FIG. 6). For the outlet housing 11, the upper part is formed into the shape of a round disc 38, the round disc 38 is equipped with two-threaded through holes 39 and 40 facing each other, and the interior of the outlet housing 11 is equipped with a tapered funnel-shaped outlet 41. In assembling these components, a cylindrical filtration screen 4 is inserted onto the cylinder 27 of the filtration sleeve 3, which is followed by inserting the split-flow bar 2 into the filtration sleeve 3 by screwing the threaded rod 20 into the threaded round hole 26, thereby forming a filtration bar 48. The filtration bar 48 is then inserted into the round through hole 13, which is followed by inserting the large gear 5 (i.e., by means of the round hole 29) onto the part of the round rod 19 of the split-flow bar 2 of the filtration bar 48 that is outside the main housing 1, and then inserting the two square keys 9 and 10 into the spaces formed by the two opposing square slots 17 and 18 of the split-flow bar 2 and the two opposing square slots 30 and 31 of the round hole 29 of the large gear 5. Afterward, the stopping disc 8 is placed next to the large gear 5 in a manner that the two square keys 9 and 10 are housed inside the two square slots 33 and 34 of the stopping disc 8. The outlet housing 11 is then installed in the circular sunk slot 22 at the bottom of the main housing 1, the two threaded holes 39 and 40 of the round disc 38 are aligned with the two threaded holes 23 and 24 on the circular sunk slot 22, and then a pair of screws 42 and 43 are inserted, thereby fastening the outlet housing 11 onto the main housing 1. Next, the residue-removing rod 12 is inserted into the round hole 16 at the lower part of the main housing 1. After assembly, the filtration screen 4 and cylinder 27 are positioned immediately below the funnel-shape opening 15 on the lower side of the intake opening 14, while a space 44 is formed between the split-flow bar 2 and the filtration sleeve 3 and the gap 44 aligns immediately with the conical hole 25. In putting the device to work (see FIGS. 3 and 4), the motor 7 is actuated, which causes a small gear 6 to rotate. The rotating small gear 6, which is linked to the large gear 5, in turn causes the large gear 5 to rotate. Since the large gear 5 and the split-flow bar 2 are bound to each other by means of the two square keys 9 and 10, the filtration bar 48 also rotates inside the round through hole 13 of the main housing 1. Meanwhile, a plastic raw material is fed from the intake opening 14, and the flow of the plastic raw material generates a pressure that causes it to pass through the filtration screen 4 and the small round holes 28 on the cylinder 27 into the space formed by the split-flow bar 2 of the filtration bar 48 and the round hole 21. Meanwhile, the filtration bar 48, which rotates continuously, mixes and transports the plastic raw material toward the space 44 formed between the split-flow bar 2 and the filtration sleeve 3, thereby allowing the plastic raw material to flow into the conical hole 25 and then to be discharged from the funnel-shaped outlet 41 of the outlet housing 11. The hydraulic cylinder 46 is also actuated together with the motor 7. The action of the hydraulic cylinder 46 causes the round rod 45 to move forward as shown in FIG. 4, which in turn causes the filtration bar 48 to move forward to a certain distance and then backward to its original position, thereby generating a reciprocating action. Meanwhile, as the plastic raw material is being mixed and stirred continuously, the transporting action causes extraneous matters to be pushed into the elliptical opening 35 of the residue-removing rod 12. After accumulating a certain amount of extraneous matters, the action of the hydraulic cylinder 46 causes the residue-removing rod 12 to be pushed outward, thereby allowing the extraneous matters accumulated inside the elliptical opening 35 and round opening 36 to be discharged from the main housing 1, thus allowing the filtration device to operate continuously without stopping.

I claim:

1. An on-the-fly long-running rotary filtration screen device comprising a main housing, said housing includes a round through hole and an intake opening in the upper part of the housing which communicates with the housing through hole via a funnel-shaped opening in said housing, the device further comprising a filtration bar formed of a split-flow bar, a generally cylindrical filtration sleeve having a threaded hole, a cylindrical filtration screen, a large gear and a rotating small gear connected to a motor, a stopping disc, two square keys, an outlet housing and a residue-removing rod, wherein (1) one end of the split-flow bar of the filtration bar is equipped with a round rod connected to a hydraulic cylinder, the other end of the split-flow bar is also equipped with a round rod, the end of this other end round rod is equipped with a protruding threaded rod, and said protruding threaded rod is screwed into the threaded hole of the filtration sleeve, (2) the filtration sleeve is equipped with a number of small round holes that are opened to the round hole center inside the filtration sleeve, and the outer surface of the cylinder is equipped with the filtration screen, (3) the upper and lower sides of the split-flow bar are each equipped with a long square slot, the filtration bar is inserted into the round through hole of the main housing, and the large gear, being annular shaped with a round center hole having two opposed square slots, is then inserted onto the split-flow bar, which is followed by inserting the two square keys into the spaces formed by the two opposing square slots of the split-flow bar and the two opposing square slots of the round hole of the large gear and then inserting the stopping disc, being annular shaped with a round center hole having two opposed square slots, next to the large gear in a manner that the two square keys are housed inside the two square slots of the stopping disc, thereby immobilizing the large gear and the stopping disc, (4) the bottom of the main housing is equipped with a circular sunk slot, the circular sunk slot is equipped with two small threaded holes, said two threaded holes are aligned with the two threaded holes of the outlet housing, and then a pair of screws are inserted, thereby fastening the outlet housing onto the main housing, (5) the residue-removing rod is inserted into a non-piercing round hole at the lower part of the main housing and is coupled to said hydraulic cylinder, (6) after actuating the motor and the hydraulic cylinder, the rotating small gear which is coupled to the large gear causes the large gear to rotate, and, since the large gear and the split-flow bar are bound to each other by means of the two square keys, the filtration bar also rotates inside the round through hole of the main housing, (7) the action of the hydraulic cylinder causes the filtration bar to reciprocate, thereby allowing a plastic raw material to be fed from the intake opening on the upper part of the main housing and through said funnel-shaped opening in said housing, pass through the filtration screen and the small round holes, mix inside the filtration bar, flow into a conical opening at the bottom of the main housing via a space formed between the split-flow bar and the filtration sleeve and be discharged from a funnel-shape outlet of the outlet housing, and (8) the mixing and agitation action causes extraneous matters to be pushed from the cylindrical filtration screen into an upper elliptical opening and a lower round opening of the residue-removing rod, and the hydraulic cylinder pushes the residue-removing rod outward periodically or when a certain amount of the extraneous matters has been accumulated, thereby allowing the extraneous matters accumulated inside the elliptical opening and round opening to be discharged from the main housing.

\* \* \* \* \*